United States Patent
Smith

(10) Patent No.: US 12,144,339 B2
(45) Date of Patent: Nov. 19, 2024

(54) WATER SOLUBLE CREMATION ASH PRODUCT AND METHOD

(71) Applicant: Maria Garcia Smith, Signal Mountain, TN (US)

(72) Inventor: Maria Garcia Smith, Signal Mountain, TN (US)

( * ) Notice: Subject to any disclaimer, the term of this patent is extended or adjusted under 35 U.S.C. 154(b) by 275 days.

(21) Appl. No.: 17/888,891

(22) Filed: Aug. 16, 2022

(65) Prior Publication Data

US 2024/0058848 A1     Feb. 22, 2024

(51) Int. Cl.
| | | |
|---|---|---|
| *A01N 1/00* | (2006.01) | |
| *B09B 3/00* | (2022.01) | |
| *B09B 3/10* | (2022.01) | |
| *B09B 3/25* | (2022.01) | |
| *B09B 101/30* | (2022.01) | |

(52) U.S. Cl.
CPC ............ *A01N 1/00* (2013.01); *B09B 3/10* (2022.01); *B09B 3/25* (2022.01); *B09B 2101/30* (2022.01)

(58) Field of Classification Search
CPC ......... B09B 3/10; B09B 3/25; B09B 2101/30; A01N 1/00

USPC ........................................................ 27/21.1
See application file for complete search history.

(56) References Cited

U.S. PATENT DOCUMENTS

| | | | | |
|---|---|---|---|---|
| 6,382,111 | B1 * | 5/2002 | Hojaji ................ | B09B 3/29 110/341 |
| 6,615,463 | B1 * | 9/2003 | Hojaji ................ | C04B 33/135 110/341 |
| 7,228,602 | B2 * | 6/2007 | Weisbrot ............ | B01J 3/062 264/234 |
| 7,866,013 | B2 * | 1/2011 | Laurens ............. | A61G 17/08 27/1 |
| 9,700,923 | B2 * | 7/2017 | Camps ............... | B44C 5/00 |
| D921,325 | S * | 6/2021 | Crowe ............... | D99/5 |

FOREIGN PATENT DOCUMENTS

| | | | | |
|---|---|---|---|---|
| CN | 101370459 A | * | 2/2009 | ............ A61G 17/08 |
| KR | 20120132721 A | * | 12/2012 | |

* cited by examiner

*Primary Examiner* — Frederick L Lagman
(74) *Attorney, Agent, or Firm* — Miller & Martin PLLC

(57) ABSTRACT

A method of distributing ashes by forming water soluble solid product(s) with the ashes. Upon wetting the water soluble product(s), the binder releases in a period of about time thereby allowing the ashes to dissipate into nature while minimizing the likelihood of having airborne ash.

12 Claims, 2 Drawing Sheets

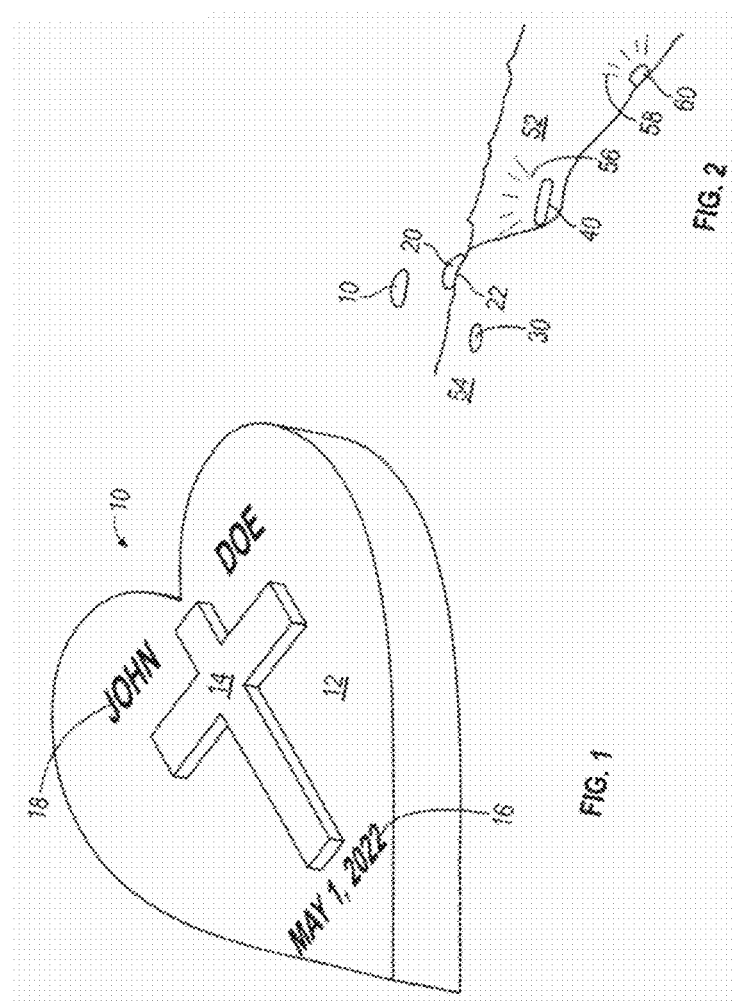

WATER SOLUBLE CREMATION ASH PRODUCT AND METHOD

FIELD OF THE INVENTION

The present invention relates to water soluble products formed with cremation ash, possibly with coloring agent(s) to honor the deceased, and method of production and use, wherein when upon exposure to moisture, at least portions partially dissolve so surf, rain and/or other water source(s) can then effectively disperse the remains in a safe manner.

DESCRIPTION OF RELATED ART

Ash is a byproduct of the cremation of people and other animals, such as beloved pets. People often honor loved ones by storing ashes in urns, or possibly spreading ashes. Biodegradable urns exist to assist in spreading ashes with the urn along with its powdery contents buried or thrown into a water source, such as a lake, etc.

When dispersing ashes, a problem can exist with the ashes, which are often powder like, covering unintended surfaces, such as portions of boats when being dispersed at sea, or airplanes if being dispersed in the air. People in the vicinity of the dispersion may unintentionally inhale ashes of the deceased, which can be distressing.

One company, Parting Stones, manufactures "non-water soluble" stones using ashes provided to them to provide a permanent keepsake. These stones appear to have the texture of solid concrete and are shaped like river stones.

Presently, children and adults build sand castles and other structures at the beach. Some may adorn sand castles with decorations such as disclosed in U.S. Pat. No. 5,718,750 which provide water soluble decorations, which could be utilized to adorn sand castles. There is no discussion of cremation, remains or ashes in the "toy" product of that disclosure.

No party is known to have a method or product to bind ashes with a water soluble binder, and possibly other material to provide an initially solid product, but one which disperses ashes when in contact with water.

Accordingly, a need exists for an environmentally friendly cremation ash product which can be washed away or otherwise disperse in an environmentally friendly manner.

SUMMARY OF THE INVENTION

Accordingly, it is an object of the present invention to provide an environmentally friendly water soluble product to potentially disperse ashes and method of its manufacture and use.

It is another object of the present invention to provide environmentally friendly dispersion system for use at the beach, river, lake, creek, drain, snow location or other desired location which has cremation ashes combined with a water soluble binder which retains the ashes (and possibly other components) in a desired configuration when dry, but when exposed to water or moisture, the binder begins to dissolve, and preferably does dissolve, thereby rendering any remaining undissolved components of the product as a powder consistency or other consistency such as sand, ash etc. Flowing water may then disperse the ashes.

It is another object of the present invention to provide at least one, if not a plurality of, water soluble products from the ashes of a single animal (which includes a person for this application) so that they may either be retained as a keepsake or disposed through dispersal or otherwise in an environmentally friendly way with honor without exposing those in attendance to airborne ash. Suitable products may have one or more water soluble binders and the ash, and sand if utilized, for some embodiments could preferably be no larger than a grain of sand before being bound with the binder. Shapes of products could be hearts, tokens, or other appropriate shapes as desired by the manufacturer. Coloring agent(s) may be added so that as the product dissolves, particularly in the surf, colorful effects may be experienced by onlookers.

Accordingly, in the preferred embodiment, one ore more units may be formed as water soluble solids with cremation ash from an animal. These units may be distributed to family/friends of the deceased after the remains of the deceased are cremated and formed into the units (and dried or cured). The units may be engraved or embossed, such as with religious symbols like a cross, name of the deceased, day(s) or other indicia. The friends/family may then keep or disperse the remains as they so desire without inhaling the ashes of the deceased.

Suitable units may take various shapes, preferably at least ¼ by ¼ by ¼ inches in size for many embodiments. Smaller shapes are believed to be difficult to work with. A method for providing the kit includes forming the token from a mixture of elements including a binder that is water soluble.

In the present embodiment, the ashes, cornstarch, sand, gelatin and food coloring are mixed together and placed in a mold and allowed to dry and/or cure. The applicant's preferred binder can air dry. Others may prefer heating to temperature or have other processes. After drying/curing, the dry product is then removed and possibly placed with a number of other products formed from the ashes of an animal in a kit. Family/friends may receive a unit, or product, and then collectively disperse the remains, or not, such as by each tossing their unit into a water source, possibly together. If different dye or colors are utilized, a colorful effect may be achieved.

As water contacts the individual units, the water soluble binder begins to break down which allows the units to break down into the individual elements of the mixture which formed the products and disperse the ashes. None of the remaining elements of the components are preferably larger than a grain of sand after the binder dissolves.

When the tide recedes, there may be no evidence of any of the units remaining as they dissolve allowing the ashes to be dispersed while the cornstarch and gelatin dissolve into the sea water and wash out to sea along with the coloring agents. Of course, in other embodiments other materials can be utilized to form the mixture as long as they are preferably selected with sensitivity to the environment.

Additionally, dispersion may occur other than by tossing into the surf. The products may be placed in or on snow. The products may be buried so that moisture in the ground may also assist in dispersion. The products may also be left exposed to the elements, such as exposed to rain and over time, rain may disperse the remains. Other sources of water could also be utilized to disperse the remains.

BRIEF DESCRIPTION OF THE DRAWINGS

The particular features and advantages of the invention as well as other objects will become apparent from the following description taken in connection with the accompanying drawings in which:

FIG. 1 is a top perspective view of a cremation ash structure constructed of at least one presently preferred embodiment of the present invention;

FIG. 2 is a side plan view of multiple units shown in FIG. 1, some after at least some water has removed a portion of the structures;

DETAILED DESCRIPTION OF THE PREFERRED EMBODIMENT

Figure 3:
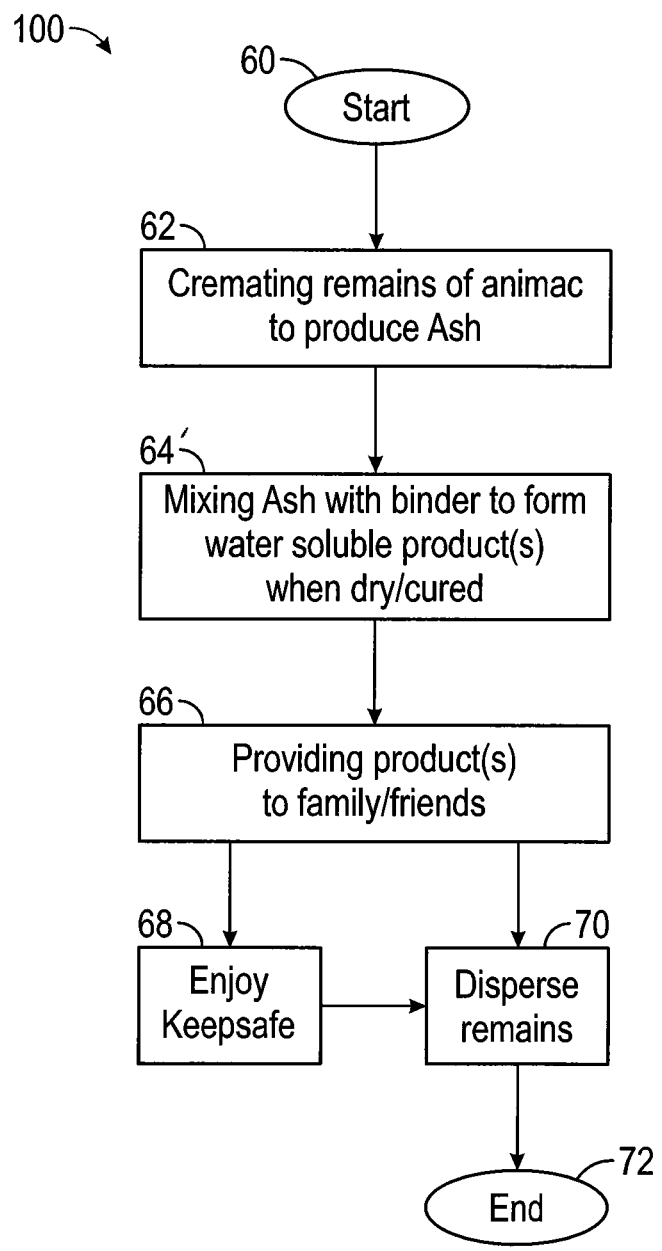
FIG. 3 is a flow chart showing the construction and use of the product of FIGS. 1 and 2.

FIG. 1 shows a water soluble structure 10 having cremation ash therein formed in accordance with a presently preferred embodiment of the present invention. Structure 10 has a heart shape, but other shapes such as round, oval, cross, or other, even more complicated or less complicated shapes could be employed when making the structure 10.

Structure or product 10 has an upper surface 12 which may be curved, flat or have other shapes. In the illustrated embodiment, an embossed indicia 14 extends upwardly away from the upper surface 12. Indicia 16 is illustrated directed onto the upper surface 12 like print. Indicia 18 is engraved into or through the upper surface 12. These or other types of indicia may be present on sides or bottom surfaces of the product 10.

Indicia 14 is a cross. Other religious symbols, precepts, verses or other spiritual or non-spiritual expressions could be embossed or provided as the other indicia 16,18. Non-religious sayings could also be provided. Indicia 16 is directly on the surface, like paint, print, etc., and is a date possibly relating to a date of birth, death or other important date and the other indicia 14,18 could have dates. Indicia 18 is engraved into or through the upper surface 12 and is a name which could be a legal name, nickname, and/or provide other information. Other indicia 14,16 could have names. While embossing, engraving and printing of indicia 14,16,18 is illustrated in FIG. 1, other indicia may be provided with other structures related to a particular animal (often a person or a pet) that has passed. Not all types of indicia 14,16,18 need be provided on a structure 10, it may be that only one type (embossed, onto the surface, engraved or other) are provided, or that more than one is provided. Also, as it relates to names, dates, bible verses, sayings, religious symbols, etc., it may be that only one, or combinations thereof may be employed on various embodiments of the structure 10.

FIG. 2 shows a plurality of products at a beach or other location. Product 10 is being dropped towards the water 52. Product 20 is dissolving from a bottom surface 22, such as if the surf barely contacted the bottom, or of a snowbank were melting under a product 20. Product 30 has been buried and the moisture in the ground 54 will cause the water soluble product 30 to dissolve into components parts less the water soluble binder which dissolves into the moisture. Product 40 has been tossed or set in water 52 and is starting to dissolve. Product 50 is partially dissolved in the water 52. At least products 40 and 50 have dye or food coloring therein which are coloring surrounding portions 56,58 of water 52 as they dissolve.

A supply of ashes from a cremated animal is made into a mixture with at least a water soluble binder to then allow to dry/cure into at least one water soluble product 10. It may be that a select few products 10, such as to be distributed to each of the children of the deceased. It may be that many are made, such as to distribute to all of the guests of a funeral. Funerals may also be near or at sources of water for relatively immediately dispersal of the remains of the deceased when people receive their product 10. Others may elect to at least temporarily retain their product 10 longer, such as at a keepsake, whether it be for a few seconds, for the rest of their lives, or any time in between.

In the preferred embodiment, a three dimensional shape illustrated as product 10 is at least ¼ inch by ¼ inch by ¼ inch. The illustrated heart or other shape could be as large as desired by the manufacturer. Furthermore, other components can be sized as desired. One or more molds of a desired shape may be selected and then a mixture of gelatin, cornstarch, cremation ash, possibly sand, food coloring and/or water added thereto. After the water dries or otherwise cures in a mold, the shape of a product 10 is formed. The ashes from a particular animal are either all in a single product 10 or distributed amongst multiple products 10. For instance, three siblings could have three products 10, one for each, or not, of a parent's ashes. Some may provide even more products, like in a situation of distributing a product 10, like a token, heart, etc. to virtually everyone that attends a funeral, which could be at a beach or other location, possibly even a church with a fountain (temporary or permanent) where the products 10 could be placed to dissolve. Some products may be kept by various parties and at least temporarily stored, if not stored for long periods of time as a solid keepsake.

FIG. 3 shows a flow chart of a making the products 10 as well as how one may distribute ashes from the products 10. The process may start at step 60. At step 62, the remains of an animal (person, pet, etc.) are cremated and result in ash. The ash is given to a manufacturing party to make water soluble products with the ash at step 64. The ash is combined with binder as a mixture and possibly water, sand, dye, or other material to form the three dimensional product(s) 10. The mixture at least one of dries and cures at step 64. If more than one product 10 is provided from the ash of a single animal, those products 10 are preferably provided as a kit to a receiving party at step 66. The receiving party is a friend or family of the deceased (even if a pet) and can then either disperse some or all of the remains at step 70 as described above or through other methods, or give some of the products to family, friends or others, some of which may keep as a keepsake at step 68, at least for a few seconds until tossing into water or other water source, if not virtually forever. Eventually, it is anticipated that even keepsakes will be discarded at some point, such as being disposed of in a landfill and wet from groundwater, the ashes will disperse at step 70 which would then end the process at step 72.

Even if provided as a kit, not all of the products 10 need to have the same configuration. Some could be bigger, some could be smaller, and the quantities could vary as desired by the various customers/manufacturers. It is important to remember that no airborne ash is dispensed when disbursing the ashes in the products 10. Also, the products 10 are water soluble. They are intended to be absorbed into nature over time. When dye or food coloring is employed as a coloring agent, it may be that the dispersal is colorful and relatively instantaneous, or it may be that it takes a significant period of time to disperse all of the ashes in a unit of product 10, possibly even years, such as if buried.

In the presently preferred embodiment, the mixture utilizes some combination of at least some of gelatin, cornstarch, cremation ash, food coloring, water and sand. After the water dries to cure in a mold, the shape such as a heart, token, etc. is formed. Other water soluble binders other than gelatin or cornstarch may be utilized with other embodiments. The object or product(s) 10 is then ready to be provided, possibly with others, to the family of the deceased as at least a temporary keepsake or to be dispersed.

Although product 10 is illustrated as heart, it could take on any desired shape. Water to break down the binder holding the elements of the mixture together could be rain, water from a hose, moisture in the ground etc. Sand could be replaced with a biodegradable substance or at least non-harmful substance. The gelatin and/or cornstarch which assist in forming the binder could also be substituted with other water soluble binders in other embodiments.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A method of disbursing cremation ashes of an animal comprising the steps of:
   a. obtaining a supply of cremation ashes from a deceased animal;
   b. preparing a mixture of the ashes with a water soluble binder and allowing to at least one of dry and cure to form at least one solid water soluble product;
   c. distributing the at least one water soluble product to at least one of family and friends of the deceased animal;
   d. the at least one of family and friends at least temporarily retaining the at least one water soluble product; and then
   e. placing at least one of the at least one water soluble product into a moist environment to thereby distribute the ashes while minimizing the possibility of airborne ash.

2. The method of claim 1 wherein the step of obtaining a supply of cremation ashes further comprises obtaining ashes of a person or pet.

3. The method of claim 1 wherein the step of forming the at least one solid water soluble product results in a water soluble product having dimensions of at least ¼×¼×¼ inches.

4. The method of claim 3 wherein the step of forming the at least one solid water soluble product results in at least one of a heart and a token shape.

5. The method of claim 1 further comprising the step of adding a coloring agent to the mixture during the step of preparing the mixture and in the step of placing the at least one water soluble product into a moist environment, the at least one the water soluble product is placed into water whereby the coloring agent disperses visually into the water as the ashes are released into the water.

6. The method of claim 5 wherein at least two water soluble products are formed in the forming step with different colors.

7. The method of claim 1 further comprising the step of providing indicia on the at least one product.

8. The method of claim 7 wherein the indicia is at least one of religious symbols, names, dates and sayings.

9. The method of claim 8 wherein the indicia is one of embossed on an exterior surface, placed on the exterior surface, and engraved into the exterior surface.

10. The method of claim 7 wherein the indicia is one of embossed on an exterior surface, placed on the exterior surface, and engraved into the exterior surface.

11. The method of claim 1 wherein the at least one product is distributed to attendees of a funeral for dispersal.

12. The method of claim 11 wherein a water source is provided at the funeral location to disperse the ashes.

\* \* \* \* \*